United States Patent [19]
Solhjell

[11] Patent Number: 5,357,495
[45] Date of Patent: Oct. 18, 1994

[54] STACKER/AUTOLOADER SYSTEM WITH INTELLIGENT MEDIA STORAGE MAGAZINE CONTROL

[75] Inventor: Erik Solhjell, Oslo, Norway
[73] Assignee: Tandberg Data A/S, Oslo, Norway
[21] Appl. No.: 907,566
[22] Filed: Jul. 2, 1992
[51] Int. Cl.⁵ .................................. G11B 17/22
[52] U.S. Cl. .......................... 369/34; 369/38; 369/30; 250/566
[58] Field of Search ............ 369/30, 34, 38; 360/92, 360/98.05; 235/479, 381, 382; 250/566

[56] References Cited

U.S. PATENT DOCUMENTS

| | | | |
|---|---|---|---|
| 3,757,944 | 9/1973 | Goodman | 250/566 |
| 4,075,669 | 2/1978 | Louzil et al. | 360/92 |
| 4,527,262 | 7/1985 | Manto | 369/38 |
| 5,109,365 | 4/1992 | Watanabe et al. | 369/30 |

FOREIGN PATENT DOCUMENTS

| | | |
|---|---|---|
| 1001299A7 | 9/1989 | Belgium . |
| 0265167A2 | 4/1988 | European Pat. Off. . |
| 0426456A2 | 5/1991 | European Pat. Off. . |
| 3914128A1 | 1/1990 | Fed. Rep. of Germany . |
| 2023564 | 1/1990 | Japan . |
| WO86/01631 | 3/1986 | PCT Int'l Appl. . |
| 2062935A | 5/1981 | United Kingdom . |
| 2240869A | 8/1991 | United Kingdom . |

*Primary Examiner*—Robert J. Pascal
*Assistant Examiner*—Haissa Philogene
*Attorney, Agent, or Firm*—Hill, Steadman & Simpson

[57] ABSTRACT

A stacker system or an autoloader system includes a tape drive and one or more magazines which each include a plurality of tape cassettes or cartridges. A positioning system moves the magazine to a specific position to load or unload a particular cartridge or cassette from the magazine. A control system controls the operation of the tape drive and the magazines between a loaded and unloaded position. Each magazine includes a unique identification code which can be read by the stacker or autoloader to determine if the correct magazine has been inserted. In addition, each magazine includes a memory to record information about the contents of the recording media stored in the magazine or the performance of each recording media stored in the magazine.

13 Claims, 4 Drawing Sheets

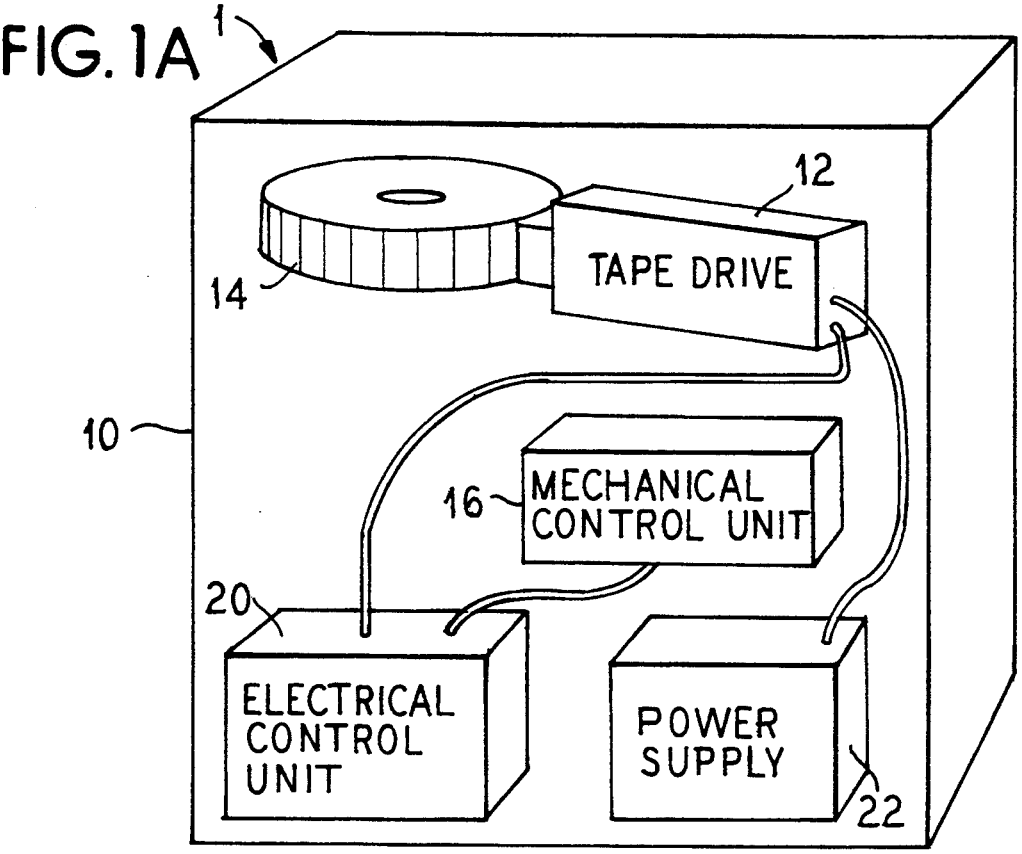
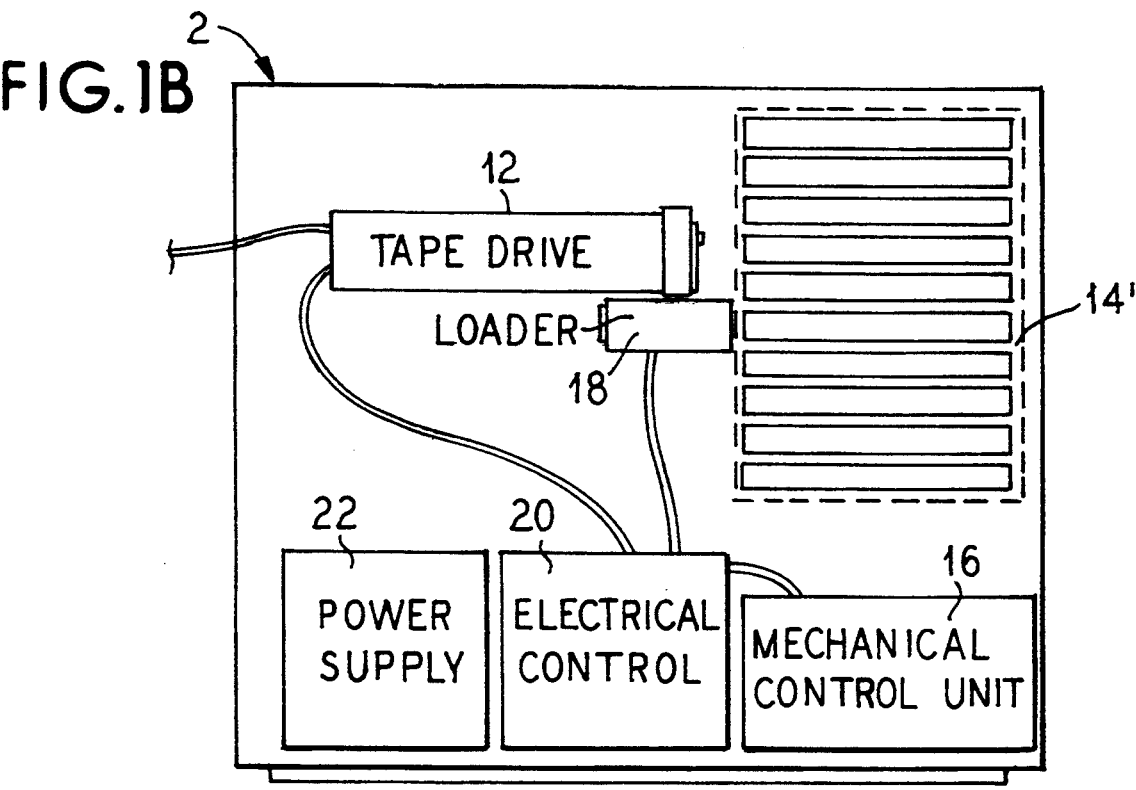

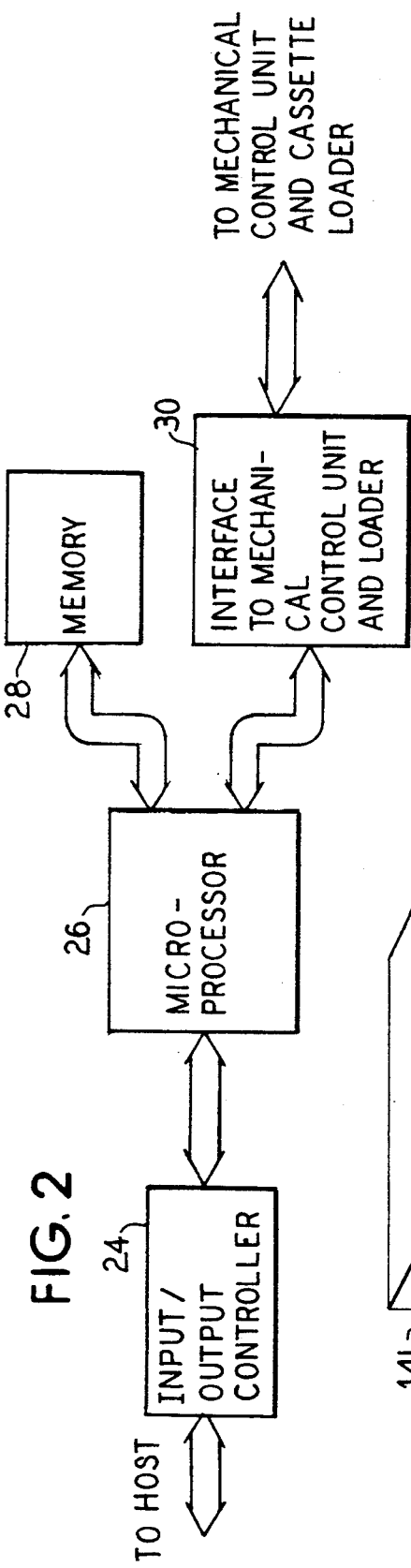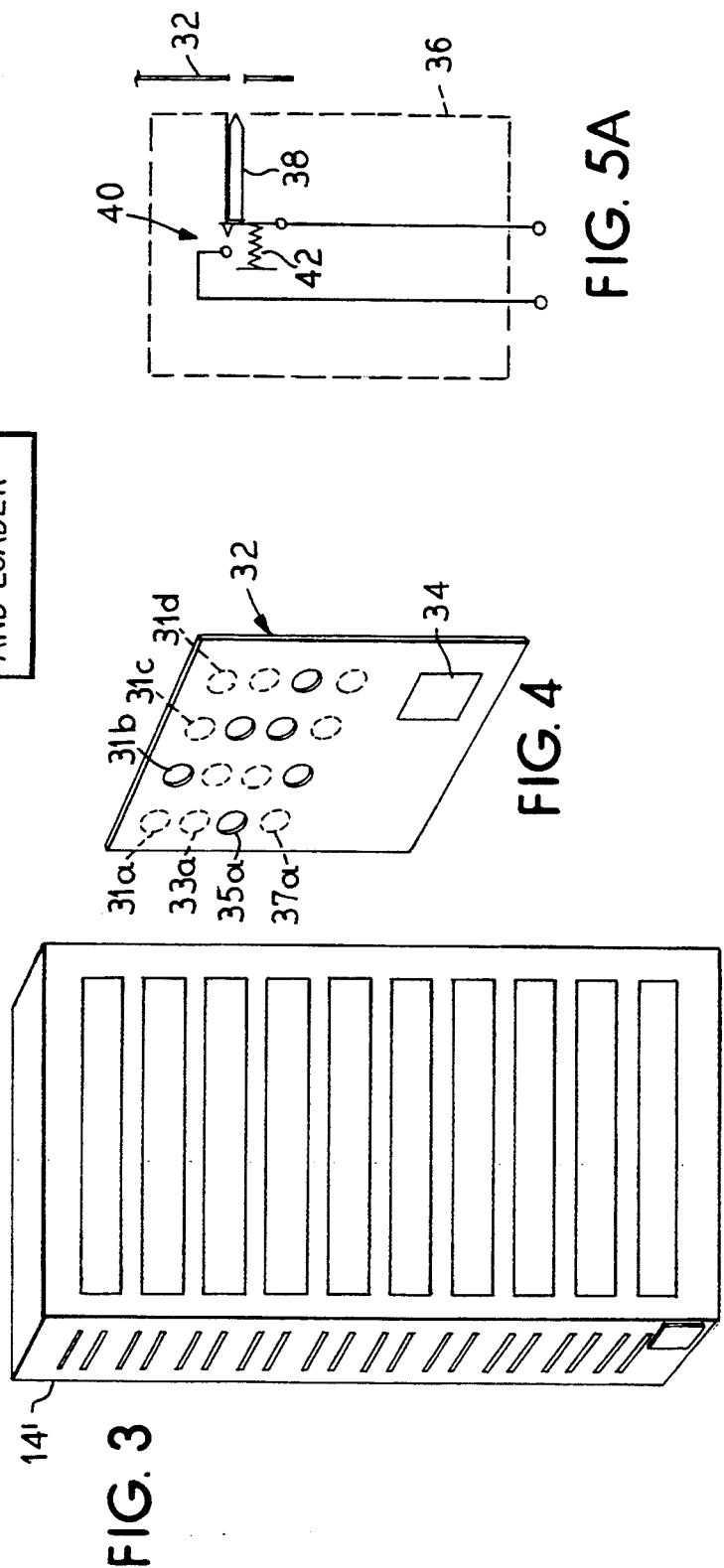

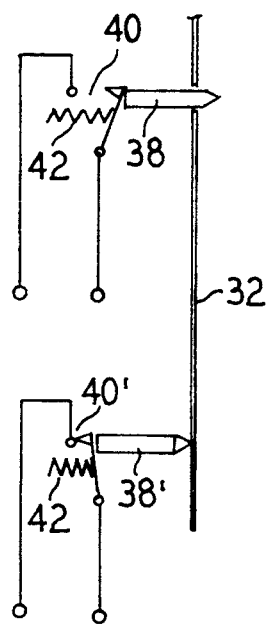
FIG. 5B
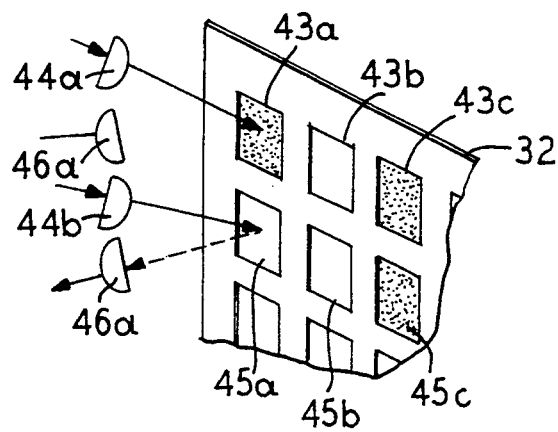
FIG. 6A
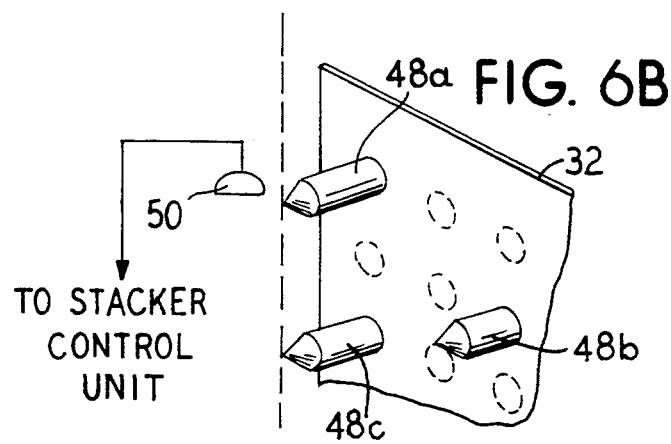
FIG. 6B
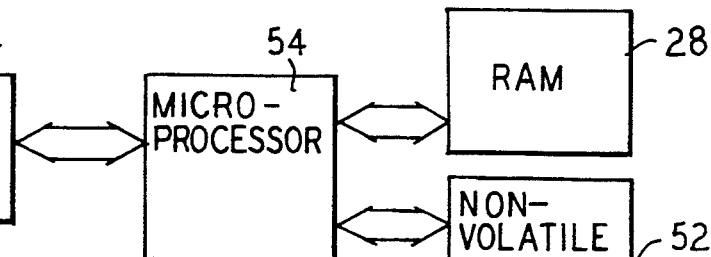
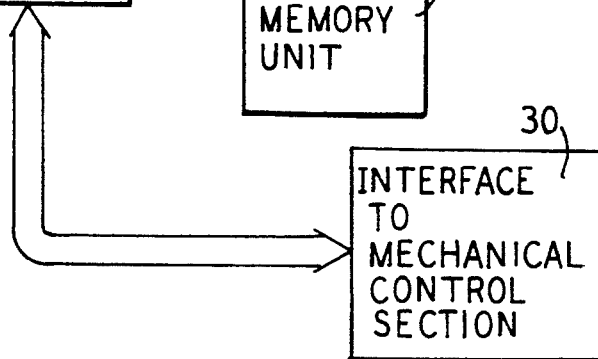
FIG. 7

STACKER/AUTOLOADER SYSTEM WITH INTELLIGENT MEDIA STORAGE MAGAZINE CONTROL

BACKGROUND OF THE INVENTION

Stacker/autoloader systems are becoming more and more important for companies having a need for very large data storage capacities at a low cost. Different types of stacker/autoloader systems are made to fit requirements of different media types, such as ¼" and ½" tape cartridges, 4 mm and 8 mm tape cassettes and writable optical tapes or disks.

A typical stacker/autoloader system has a single tape drive and a single magazine. A specially designed magazine containing the tape cassettes or cartridges may be placed in a magazine holder of the stacker/autoloader system. Many systems include a door covering the magazine after it is loaded. Often this door can be physically locked either mechanically or electrically to prevent injuring an operator while the magazine is moving.

The stacker/autoloader system, based on commands from a connected host, sends signals to a mechanical magazine positioning system to move the magazine to a specific position such that a particular cassette is in front of the tape drive. Signals will then be issued to a loading mechanism to activate a cassette load operation which will load the cassette into the tape drive. The tape drive may then be activated to perform one or more read or write operations.

At the end of the operations, the system initiates an unload operation placing the cassette back into the magazine. The control unit may then move the magazine to a new position to enable the loading of another cassette and so on. Although some systems may only operate with the cassettes in the magazine in a sequential order, i.e. cassette 1 first, then cassette 2, then cassette 3 and so on, systems may be designed such that cassettes or cartridges may be randomly selected for loading/unloading.

At the end of a complete magazine operation, the operator may open the stacker/autoloader door and take out the magazine and store it for later use. The operator may then install another magazine, and the host may continue its operation on the stacker/autoloader system.

Compared to a single drive, a stacker/autoloader makes it possible to increase total capacity with a typical factor in a range of four to sixteen times for a stacker and from fifty and upwards for an autoloader. This is achieved at a low total system cost. The user may have many magazines loaded with tape cartridges, and the stacker/autoloader may, therefore, act as an efficient, low-cost library system.

However, having many magazines available also increases the risk of the operator loading an incorrect magazine, The host will normally be able to detect the use of an incorrect magazine by reading the contents of one or more of the cassettes/cartridges, but this is a time-consuming operation which slows down the performance of the total system.

SUMMARY OF THE INVENTION

The present invention describes tape drives which operate using a magazine having tape cassettes or cartridges. In addition, stacker/autoloader systems suitable for operating on writable optical tape cassettes or disks are described.

The stacker/autoloader system of the present invention comprises a cabinet, a tape drive or a plurality of tape drives, one or more magazines containing anywhere from four to sixteen tape cassettes in a stacker system and fifty or more tape cassettes or cartridges in an autoloader system. In addition, a magazine mechanical positioning system is used to move the magazine to a specific position in order to enable the loading or unloading of a particular cartridge or cassette. A loader/unloader system loads the selected cassette/cartridge from the magazine to the tape drive or unloads it from the drive back to the magazine. An electrical control system controls the operation of the tape drive(s) in the magazine(s), and a power supply is required for the whole unit. Finally, the tape drive electronics and the control electronics may be combined into one unit such that the positioning of the magazine and the operation of the cartridge load/unload system is controlled directly from the drive electronics.

The present invention, however, minimizes the risk of errors by an operator associated with prior art systems by providing means for automatic detection of the cassette magazine number and also information of the actual data contents on the cassette/cartridge stored in the magazine.

BRIEF DESCRIPTION OF THE DRAWINGS

FIG. 1A is a block diagram of a typical autoloader assembly using a carousel for storing cartridges.

FIG. 1B is a block diagram of a typical stacker assembly using a magazine for storing cartridges.

FIG. 2 is a block diagram of an electronic system for the autoloader or stacker assemblies shown in FIGS. 1A and 1B.

FIG. 3 is a diagram of the magazine of the present invention having an identification disk for sensing for an inserted magazine.

FIG. 4 is a diagram of a hole arrangement of the identification plate.

FIG. 5A is a diagram of a sensing unit mounted on a magazine holder for detecting holes in the plate using electrical contacts.

FIG. 5B illustrates the sensing unit of FIG. 5A in an open and a closed position for detecting holes in the plate.

FIG. 6A is another embodiment of a sensing unit for detecting holes in the plate using optical components.

FIG. 6B is another embodiment of a sensing unit for detecting holes in the plate using magnetic pins.

FIG. 7 is a block diagram of an electronic control unit for the autoloader or stacker assemblies including a non-volatile memory unit.

DETAILED DESCRIPTION OF THE PREFERRED EMBODIMENTS

Figure 8:
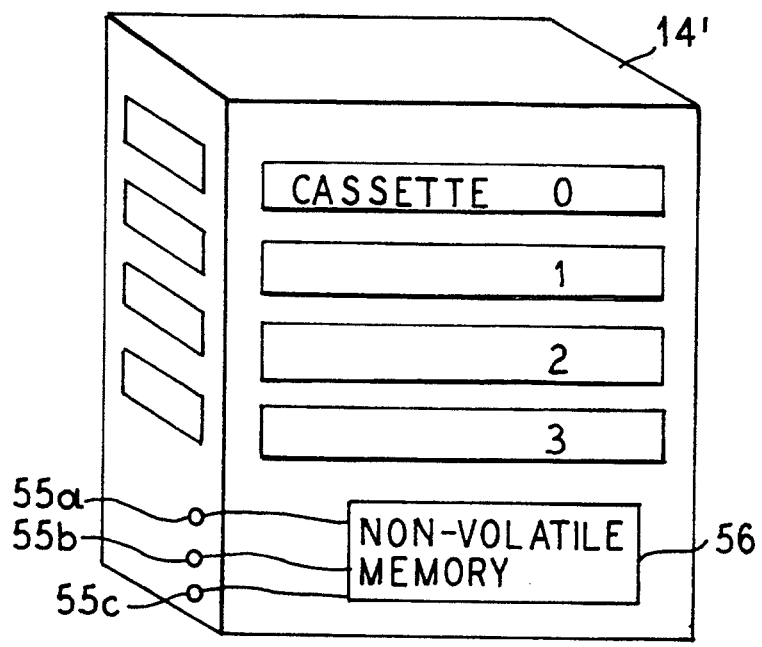
FIG. 8 is a diagram showing contacts which connect the non-volatile memory unit with the control unit when the magazine is inserted.

An autoloader system 1 and a stacker system 2 are shown in FIGS. 1A and 1B, respectively. The autoloader system includes a cabinet 10 and a tape drive 12. Frequently, two or even more tape drives are included especially in autoloader systems. A cartridge carousel 14 of the autoloader system 1 or magazine 14' of the stacker system 2 may contain anywhere from four to sixteen tape cassettes in the stacker system 2 and fifty or more cassettes or cartridges in the autoloader system 1. A mechanical control unit 16 controls the movement of the magazine 14' or cartridge carousel 14 to a specific position in order to enable the loading or unloading of a particular cartridge or cassette. A loader/unloader system 18 loads the selected cassette or cartridge from the carousel 14 or magazine 14' to the tape drive 12 or unloads it from the drive 12 back to the carousel 14 or magazine 14'. An electrical control unit 20 controls the operation of the tape drive 12 and the carousel 14 or magazine 14'. A power supply 22 provides a source of power for the entire stacker system 2 or autoloader system 1. (Hereinafter, the magazine 14' and carousel 14 are used interchangeably.)

FIG. 2 illustrates a block diagram of the electronic system for the autoloader system 1 or stacker system 2 as shown in FIGS. 1A and 1B, respectively. An input/output controller 24 receives instructions from a host, or alternatively, sends instructions to the host. A microprocessor 26 processes input data from the controller 24 and memory 28. The microprocessor 26 in turn sends instructions via the interface 30 or, in the alternative, receives instructions via the interface 30 in order to control the mechanical control unit 16 and the cassette loader 18. The position of the control unit 16 and the cassette loader 18 is then sent to the microprocessor 26 and stored in the memory 28 such that a specific position of a particular cartridge or cassette is known at all times.

FIG. 3 shows a magazine 14' having seven cartridges C0, C1, C2, C3, C4, C5 and C6 loaded therein. On each magazine 14', a small plate 32 is mounted. The plate 32 is equipped with a number code or identification number defined by the existence of holes or the non-existence of holes in pre-defined areas. The plate 32 may be sensed by the stacker system 2 or autoloader system 1 when the magazine 14' is inserted.

FIG. 4 illustrates such a hole arrangement of the disk 32 with the total number of possible holes defining the maximum number of different magazine numbers. The hole arrangement shown in FIG. 4 allows for sixteen different magazines defined by hole locations 31a–31d, 33a–33d, 35a–35d and 37a–37d. The hole locations 31b, 33c, 35a, 35c, 35d and 37b are indicative of a "no hole" condition in the illustrative arrangement. In addition, a special area 34 of the plate 32 is defined as "always closed". The special area 34 is then used to detect that a magazine 14' has been loaded, and that the magazine 14' contains the plate 32.

Therefore, every magazine 14' contains the identification plate 32. When inserted in a magazine holding unit in the stacker system 2 or autoloader system 1, the magazine holding unit detects the presence of the identification plate 32 and an actual identification number. To this end, the magazine holding unit includes a sensor 36 as shown in FIG. 5A. The sensor 36 detects the presence of the holes or no holes condition in the identification plate 32.

The sensor 36 may use a pin 38 mounted to a contact 40 which is loaded by a spring 42 to provide an electrical connection as shown. If the pin 38 is positioned such that it fits into a hole in the plate 32 of the magazine 14', the corresponding contact 40 will stay open. However, if the plate 32 contains no hole in the actual area, the pin 38 is pressed in when the magazine 14' is loaded, and the corresponding contact 40 will be closed. This is illustrated in FIG. 5B.

Therefore, the code number given by the hole pattern on the plate 32 may be converted to a combination of opened and closed contacts which may be electrically read by the stacker system 2 or autoloader system 1 and may be used to determine whether the magazine 14' having a correct ID number has been inserted. In addition, to reduce operating errors, each magazine 14' may also be equipped with an indicator, such as a name or number tag, etc. which may be read by an operator and may correspond to the actual code of the inserted plate 32.

Another embodiment for reading out the code pattern from the plate 32 is a system which is designed to use light as a detection method. Such a system is illustrated as shown in FIG. 6A.

In FIG. 6A, light transmitters 44a and 44b in the magazine holding unit of the stacker system 2 or autoloader system 1 may transmit light towards the plate 32, and light will be reflected from areas having no holes and not reflected from areas having holes. As shown in FIG. 6A, the plate 32 may not contain holes at all. The hole pattern may be replaced by a series of reflective and non-reflective areas, such as blank or white reflective areas 43b, 45a and 45b and black nonreflective areas 43a, 43c and 45c. Using the light transmitters 44a and 44b, no mechanical sensors are required for the stacker system 2 or autoloader system 1 to sense that the magazine 14' is inserted or to detect the code of the magazine 14'.

Another detection system is as shown in FIG. 6B in which the magazine 14' is equipped with a special holder which holds a number of magnetic pins 48a, 48b and/or 48c, for example. The magazine number is coded by inserting a single or a plurality of magnetic pins, such as pins 48a, 48b and/or 48c in all or a portion of the holes of the plate 32. When the magazine 14' is inserted in the stacker/autoloader, a sensor system will sense the presence of each pin 48a, 48b and/or 48c. By using magnetic pins, no mechanical contact sensor system is required. The presence or non-presence of each pin 48a, 48b and/or 48c may be sensed using a Hall-effect magnetic sensing element 50. As a result, the control unit 16 of the stacker system 2 or autoloader system 1 may identify the inserted magazine 14'.

Each of the above described sensing methods may be effectively implemented to reduce operator errors. In addition, each magazine 14' includes a number or name indicator which may be read by the operator. Each indicator must correspond to the number of the plate 32. The indicator may be in the form of a name tag, or it may be more sophisticated by using some form of an electronic indicator, such as an LED or LCD unit to show the number or name directly. The operator may then be informed about the name or code of the magazine 14' which is required. The stacker 2 or autoloader 1 may then test for the correct code number and may immediately warn the operator if an incorrect magazine has been loaded.

As shown in FIG. 7, the stacker system or autoloader system of FIG. 2 may further be equipped with an electrical control unit 54 including means to physically remember key information about the contents of each cassette in each magazine. As shown, the control unit 54 of the stacker or autoloader contains a non-volatile memory unit 52, such as a flash memory or an EE-PROM, in addition to a RAM 28. Information about the actual contents of each magazine and each cassette within the magazine may be stored in the non-volatile memory 52. Information may be updated as operations on each magazine proceeds. By including the memory unit 52 in the stacker system 2 or autoloader system 1, each system may operate more effectively. The host need not keep track of the contents of each magazine and/or cassette since the stacker system 2 or autoloader system 1 itself may now perform that function.

A problem may arise, however, if the magazines are used in several stacker systems or autoloader systems. When this occurs, one or more cartridges may be updated when the magazine is inserted in one stacker system or autoloader system, and if the magazine is later inserted into another stacker system or autoloader system, the second system will have incorrect information about the contents of the actual magazine since it was recorded by another stacker system or autoloader system.

This problem may be solved by including actually recorded information about the contents of each cassette or cartridge in the magazine 14' on one of the cassettes or cartridges in the magazine 14', for example, on the first or the last cassette or cartridge. This must be done at the end of every recording operation. The stacker system 2 or autoloader system 1 may then begin the operation on a new inserted magazine by first reading the special magazine data information from the specified cassette.

In addition, the problem previously mentioned may also be solved without the need to write special magazine data on one of the cassettes. This solution is shown in FIG. 8 where each magazine 14' may be equipped with its own non-volatile memory 56. Power for the memory 56 may come from the magazine holder when the magazine 14' is loaded, and therefore, no internal battery is required. The nonvolatile memory 56, in addition, does not need any power except when data is being transferred between the memory and the stacker system 2 or autoloader system 1. Contacts 55a, 55b and 55c as shown in FIG. 8 electrically connect the nonvolatile memory 56 with the stacker or autoloader control unit 54 (shown in FIG. 7) when the magazine 14' is inserted in the stacker system 2 or autoloader system 1. Although battery power is not required, a volatile memory with battery backup may be used.

When the magazine 14' is loaded, data may be transferred from the control unit 54 of the stacker system 2 or autoloader system 1 to the non-volatile memory 56 of the magazine 14' or vice versa. This data transfer operation may be performed as a parallel operation with four bits or eights bits or more bits in parallel, or it may be performed as a serial operation. The serial operation is generally preferred since the number of electrical contacts between the magazine holder and the magazine 14' can then be kept to a minimum.

The non-volatile memory 56 may then be recorded with a specific magazine number either at the time of manufacturing or at the first time that the magazine 14' is used. This number may then be read back by the control unit 54 of the stacker or autoloader. This may replace the mechanical code disk system described above.

Using a non-volatile memory 56 installed in the magazine 14', the stacker or autoloader control unit 54 may also record other specific data information into the memory 56. This includes data information about the actual contents of each cassette or cartridge in the magazine 14'. Each time the information on one or more of the cassettes is updated, the stacker/autoloader may store the updated information about the actual cassette contents in the non-volatile memory 56. This allows free exchange of magazines among many stacker systems or autoloader systems and keeps the total system completely updated. Each time data on one or more of the cassettes in the magazine 14' is updated, the non-volatile memory 56 in the magazine 14' may also be updated with information about the new data contents. Magazines may then be freely moved between different stacker systems or autoloader systems since each system can read out the contents of the non-volatile memory 56 in the magazine 14' and keep it updated at the end of each recording operation.

Such designs of a magazine 14' with a non-volatile memory unit 56 may also be used to track the number of times a cartridge has been recorded or read and also the performance of each cartridge, As a result, the control unit 54 in the stacker system 2 or autoloader system 1 can keep track of the use and performance of each cassette or cartridge in each magazine 14' and warn the operator about potential malfunctions and worn cartridges before a major problem occurs.

Whether the system is equipped with a mechanical disk code system or a non-volatile memory system, it is possible to design a special magazine storage system for magazines not being used where the magazine storage system may be designed to read the magazine identification number from each magazine and show the number of each stored magazine in a display or displays.

Figure 9:
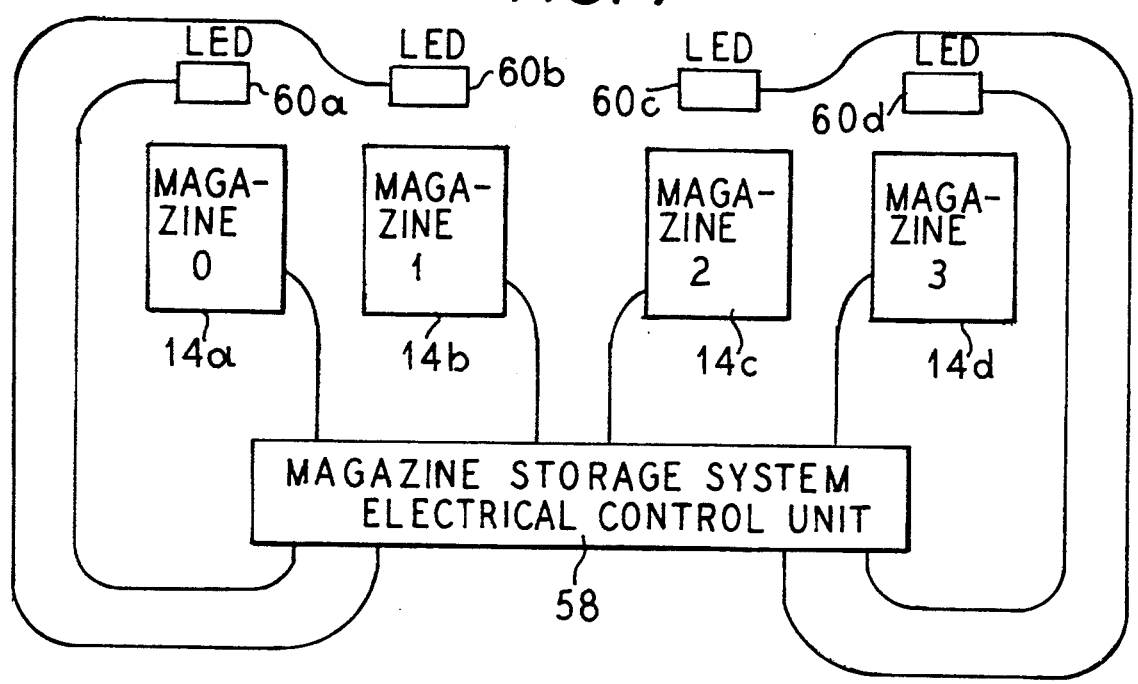
FIG. 9 is a diagram of a storage system for magazines when the magazines are not installed in the stacker including displays for each magazine.

As shown in FIG. 9, LED or LCD displays 60a, 60b, 60c and 60d which are close to each magazine 14a, 14b, 14c and 14d showing the actual magazine number may be used. When a non-volatile memory is used in the magazines 14a, 14b, 14c and 14d, these displays 60a, 60b, 60c and 60d may also read the actual contents of the magazine, such as employees, customer lists, payments made, etc., via an electrical control unit 58. This further reduces the possibility of errors by an operator.

Although other modifications and changes may be suggested by those skilled in the art, it is the intention of the inventor to embody within the patent warranted hereon all changes and modifications as reasonably and properly come within the scope of the contribution to the art.

We claim:

1. A system for stacking or autoloading a plurality of removable storage media for use in a drive, said system comprising:

a magazine for storing said plurality of removable storage media;

transport means for loading or unloading a selected one of said plurality of said storage media from said magazine;

positioning means for moving said magazine to a specified position relative to said transport means to enable loading or unloading of said selected one of said plurality of storage media from said magazine;

control means for controlling operation of said positioning means, said transport means and said drive;

identifying means inseparably and integrally related to said magazine, including a plate with a coded pattern uniquely identifying said magazine, the coded pattern further indicative of information relating to said plurality of said storage media from said magazine; and determining means for sensing said pattern indicative of said magazine being moved by said positioning means, for verifying said magazine has been loaded, and for verifying a correct magazine has been moved by said positioning means.

2. The system of claim 1 wherein said pattern is a plurality of holes.

3. The system of claim 1 wherein said pattern is a plurality of reflective areas.

4. The system of claim 1 wherein said identifying means includes a plurality of magnetic pins integrally related to said magazine.

5. The system of claim 1 wherein said determining means senses said pattern mechanically, optically, magnetically and/or electrically.

6. The system of claim 1 further comprising:
memory means for storing data regarding contents of said magazine and said plurality of storage media.

7. The system of claim 6 wherein said memory means is a non-volatile memory and/or a volatile memory having a back-up battery.

8. The system of claim 1 wherein said magazine further comprises:
an internal non-volatile memory for storing said pattern wherein said pattern in said internal memory may be read by said control means.

9. The system of claim 8 further comprising:
means for updating information stored in said internal memory, said information being updated when new data is recorded in at least one of said plurality of storage media.

10. The system of claim 9 wherein said information includes recording performance and/or number of operations on each of said plurality of storage media, said information may be read by said control means.

11. A system for stacking or autoloading a plurality of removable storage media for use in a drive, said system comprising:
a plurality of magazines, each of said plurality of magazines storing said plurality of removable storage media;
holding means for holding said plurality of magazines;
transport means for loading or unloading a selected one of said plurality of said storage media from one of said plurality of magazines;
positioning means for moving said one of said plurality of said magazines to a specified position relative to said transport means to enable loading or unloading of said selected one of said plurality of storage media from said one of said plurality of magazines;
control means for controlling operation of said positioning means, said transport means and said drive;
identifying means inseparably and integrally related to each of said plurality of magazines, including a plate with a coded pattern uniquely identifying each of said plurality of magazines; and
determining means for sensing said pattern indicative of said one of said plurality of magazines being moved by said positioning means, for verifying said one of said plurality of magazines has been loaded, and for verifying a correct one of said plurality of magazines has been moved by said positioning means.

12. The system of claim 11 wherein said display means displays information regarding content of each of said plurality of magazines.

13. The system of claim 11 further comprising:
display means for displaying said code of said plurality of magazines in said holding means.

* * * * *